Patented May 12, 1953

2,638,479

UNITED STATES PATENT OFFICE 2,638,479

METHOD FOR THE PREPARATION OF ESTERS OF BETA-OXY ALDEHYDES

Seaver A. Ballard, Orinda, and Bradford P. Geyer, Berkeley, Calif., assignors to Shell Development Company, San Francisco, Calif., a corporation of Delaware No Drawing. Application January 3, 1949, Serial No. 69,067

9 Claims. (Cl. 260—468)

This invention relates to a method for the preparation of esters of oxy-aldehydes. More particularly, the present invention relates to a process for the preparation of aldehydes that have an acyloxy group of a carboxylic acid directly linked to a carbon atom of the aliphatic type in the beta position relative to the formyl group of the aldehyde, by reaction effected between carboxylic acids and alpha, beta-unsaturated aldehydes.

The compounds that are prepared by the process of the present invention comprise the carboxylic acid esters of the beta-hydroxy aldehydes, i. e., of the aldehydes that have a hydroxyl group directly linked to a carbon atom that is in the beta-position relative to the formyl group. Certain compounds of this general type have been described heretofore in the art. However, the methods that have been employed heretofore for the preparation of such known compounds have not been entirely satisfactory, particularly from the standpoint of their possible utilization on a commercial scale. In some cases, the methods heretofore employed have required the use of excessively expensive raw materials, or of raw materials that are not readily obtainable or that in themselves may be prepared only with difficulty. In other instances the known methods have been undesirably complex, apart from the particular raw materials utilized, and have involved a multiplicity of procedural steps, etc. Processes heretofore known for the preparation of esters of beta-oxy aldehydes frequently have led to the formation of complex reaction mixtures which are difficult to separate into their components and which would involve use of undesirably expensive or difficult recovery procedures to separate the desired product in any but a relatively crude state in satisfactory yields.

The process of the present invention has several advantages. It provides a direct, single-step method for the preparation of carboxylic acid esters of beta-hydroxy aldehydes from readily available raw materials. The process of the present invention may be utilized to provide a reaction mixture from which the desired product may be recovered by simple procedures, such as fractional distillation, crystallization, etc. Any unreacted reactants generally may be separated in like manner from the reaction mixture and utilized in the preparation of further quantities of the desired product, if desired, the consequent advantages in the over-all efficiency of the process. A further advantageous characteristic of the present process is that the reaction whereby the desired products are formed leads to the formation of no other products, such as the water formed during esterification reaction between a carboxylic acid and an alcohol, thereby further simplifying recovery of the desired produce and/or reutilization of excess reactants in the process.

The process of the present invention essentially comprises heating in liquid state a mixture comprising an unsaturated aldehyde wherein the carbon atoms in the alpha and beta positions relative to the formyl group are connected together by a carbon-to-carbon double bond of the aliphatic type and a carboxylic acid corresponding to the ester to be prepared, under conditions of temperature, amounts of the reactants, and time which favor the desired reaction. Addition of the elements of the organic carboxylic acid at the alpha and the beta carbon atoms of the unsaturated aldehyde is effected to provide, as a principal product of the process, the ester of the carboxylic acid with the beta-hydroxy alpha, beta-saturated aldehyde containing the same number and arrangement of carbon atoms as the unsaturated aldehyde reactant. The reaction is thought to proceed substantially as follows:

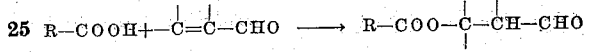

In this equation, R—COOH signifies the carboxylic acid, and

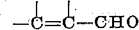

signifies the unsaturated aldehyde reactant. The ester of the carboxylic acid with the beta-hydroxy-alpha, beta-saturated aldehyde obtained as the product, appears on the right-hand side of the equation.

It will be noted that although the products thus formed may be and are referred to as esters of beta-oxy, or beta-hydroxy, aldehydes, the designation is one based upon their structure and not upon the reaction by which they are formed in the present process. The reactions expressed in the foregoing equations thus are not esterification reactions in the usual sense. As far as is known, the free beta-hydroxy aldehyde plays no part in the process, as an intermediate or otherwise.

The aldehydes which may be employed in accordance with the invention are those aldehydes which contain at least three carbon atoms and wherein the carbon atom which is directly linked to the carbon atom of the carbonyl group is directly linked to a third carbon atom by a carbon-to-carbon double linkage of the nonaromatic, or aliphatic (including cycloaliphatic) type. Particularly favorable results may be obtained when there is employed in the process of the invention an alpha,beta-olefinic aldehyde having a secondary carbon in the alpha position relative to the formyl group, the alpha carbon atom preferably having one of its valencies satisfied by union with an atom of hydrogen. More generally speaking, each of the free bonds at the alpha and the beta carbon atoms of the alpha,beta-unsaturated aldehyde may be satisfied by various groups, such as alkyl, aryl, cycloalkyl, alkaryl, and/or aralkyl groups, or the alpha and beta carbon atoms may form portion of ring structure, such as a cycloölefinic ring. Suitable unsaturated aldehydes have structures represented by the formula

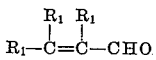

in which each $R_1$ represents the hydrogen atom or lower saturated hydrocarbon or monocyclic aromatic hydrocarbon group. The 2-alkenals, wherein each $R_1$ of the above formula represents hydrogen or an alkyl group, are preferred. While various and numerous alpha,beta-unsaturated aldehydes may be employed in accordance with the generic aspects of the invention, those alpha,-beta-olefinic aldehydes in which the alpha carbon atom bears an atom of hydrogen and the remaining valencies of the beta carbon atom are satisfied by hydrogen atoms and/or alkyl groups, are particularly suitable.

Representative alpha,beta-unsaturated aldehydes which may be employed include, among others, the following: acrolein, methacrolein, crotonaldehyde, tiglic aldehyde, alpha-ethylacrolein, alpha-hexylacrolein, alpha-cyclohexylacrolein, beta-cyclohexylacrolein, 1-cyclohexene-2-carboxaldehyde, beta-phenethylacrolein, alpha-chloroacrolein, alpha-methyl-beta-ethylacrolein, beta-octylacrolein, alpha-isopropyl-beta-isobutylacrolein, and homologs and analogs thereof. The yield of and conversion to the beta-acyloxy aldehyde is dependent in part upon the particular unsaturated aldehyde that is employed. In general, the most favorable yields and conversions may be obtained when acrolein is employed as the unsaturated aldehyde.

As illustrated in the examples, carboxylic acids of various types may be reacted according to the invention with unsaturated aldehydes of the general class defined herein to produce valuable esters of the carboxylic acid with beta-oxy aldehydes. One group of suitable carboxylic acids comprises those of the aliphatic type, including the saturated aliphatic carboxylic acids, such as formic acid, acetic acid, propionic acid, butyric acid, isobutyric acid, caproic acid, caprylic acid, lauric acid, myristic acid, palmitic acid, and stearic acid, as well as the unsaturated aliphatic carboxylic acids, such as acrylic acid, crotonic acid, vinylacetic acid, methacrylic acid, tiglic acid, senecioic acid, alpha-ethylcrotonic acid, 2-octenoic acid, oleic acid, propiolic acid, sorbic acid, and their analogs and homologs. Aromatic carboxylic acids may also be employed, such as benzoic acid, the naphthoic acids, cinnamic acid, the toluic acids, chlorobenzoic acid, anisic acid, phenylpropiolic acid, phenylacetic acid, and homologs and analogs thereof. Alicyclic carboxylic acids form a further group of carboxylic acids which may be employed. These include, for example, cyclohexanecarboxylic acid, cyclopentanecarboxylic acid, cyclohexenecarboxylic acid, cyclopentenecarboxylic acid, cyclohexaneacetic acid, the dimethylcyclohexanecarboxylic acids, beta-cyclopentylpropionic acid, 2-norcamphenecarboxylic acid, and the various homologs and substitution products thereof. A preferred class of carboxylic acids is represented by the formula R—COOH in which R represents the hydrogen atom, an aliphatic hydrocarbon group, a cycloaliphatic hydrocarbon group, or an aromatic hydrocarbon group. It frequently may be the case that the esters of beta-oxy aldehydes to be prepared by the process of the invention are desired, for example, as intermediates for the synthesis of derived organic compounds and that in such cases the specific identity of the acyloxy group linked to the beta carbon atom of the aldehyde is not an important factor. It has been found that the lower aliphatic monocarboxylic acids, such as formic acid, acetic acid, acrylic acid and their lower homologs and analogs may be employed with particular advantage in the present process, by reason of their low cost and because of the particularly favorable results that may be obtained in the execution of the process. The saturated lower aliphatic carboxylic acids are particularly preferred.

In general, higher yields of and conversions to the desired beta-acyloxy aldehyde are obtained when the carboxylic acid is one that is devoid of branching at the alpha carbon atom than when there is branching in the carbon chain at the alpha carbon atom or when the alpha carbon atom is included in the ring of a cyclic group or nucleus.

While the carboxylic acid preferably may be unsubstituted, the presence of unreactive, stable substituent groups in the carboxylic acid molecule is not precluded. The carboxylic acid may contain, for example, one or more halogen atoms, such as fluorine, bromine, or chlorine, oxygen atoms as in ether linkages, in ester groups, etc., sulfur atoms, as in thioether linkages, and similar groups or atoms that do not interfere with the reaction effected according to the process of the invention.

The process of the invention comprises, broadly stated, heating a reaction mixture comprising the carboxylic acid and the alpha,beta-unsaturated aldehyde which are to be reacted, at an elevated temperature which promotes the desired reaction but which is within limits such that there are avoided excessive undesired side reactions, polymerization, decomposition, or the like. The process may be executed either batchwise, continuously, or intermittently. In a batchwise execution of the process, the alpha,-beta-unsaturated aldehyde and the selected carboxylic acid may be mixed together in suitable proportions, the carboxylic acid preferably being present in moderate excess, and the mixture heated in liquid phase at an elevated temperature for a time sufficient to form in appreciable quantity the ester of the beta-oxy aldehyde. The reaction mixture then may be cooled, or if desired it may be subjected directly to a suitable separation treatment, such as fractional distillation or other appropriate method, whereby the desired reaction product is recovered.

When the carboxylic acid and the alpha,beta-unsaturated aldehyde are mutually soluble or miscible under the reaction conditions, it generally is unnecessary to include a solvent in the reaction mixture. In the event the carboxylic acid and the alpha,beta-unsaturated aldehyde have under the reaction conditions insufficient mutual solubility, or if desired for other reasons, an inert organic solvent may be included in the reaction mixture in moderate amounts. Suitable inert solvents include, for example, saturated hydrocarbons, aromatic hydrocarbons, halogenated saturated hydrocarbons and halogenated aromatic hydrocarbons, ethers, esters, and like solvents which are inert with respect to both the reactants and the reaction products under the conditions employed.

The reaction between the carboxylic acid and the alpha,beta-unsaturated aldehyde proceeds satisfactorily in the absence of added catalysts, although if desired suitable catalysts may be added to the reaction mixture, or the reaction mixture may be contacted with a suitable catalyst during the execution of the process, whereby the rate of reaction may be accelerated. The invention thus includes carrying out the process in the presence of minor amounts of, for example, mildly alkaline substances, inorganic catalytically active salts, or acid-reacting substances which may be included in the reaction mixture in amounts up to about 10% or more by weight of the reactants or contacted with the reaction mixture to accelerate the desired reaction between the carboxylic acid and the alpha,beta-unsaturated aldehyde. The use of alkaline catalysts is in general less desirable because of the possibility that they may promote excessive resinification or condensation of the alpha,beta-unsaturated aldehyde or of the desired product. Acid-reacting substances, the use of which is included by the invention, are, for example, strong mineral acids, such as hydrochloric acid, sulfuric acid, hydroiodic acid, hydrobromic acid, phosphoric acid, etc.; acid-reacting salts, such as sodium acid sulfate, sodium dihydrogen phosphate, zinc chloride, iron chloride, or stannous chloride; and even organic acids or their suitable salts, such as aromatic sulfonic acids, halogenated aliphatic acids, and salts thereof. The catalyst, if one is employed, may be supported on an inert or a catalytically active supporting material, such as pumice, charcoal, alumina, porcelain, diatomaceous earth, etc. It may be advantageous to include in the reaction mixture a minor amount of any of the known antioxidants or polymerization inhibitors, such as a phenolic compound, that reduce or prevent polymerization of alpha,beta-unsaturated aldehydes. Hydroquinone is eminently satisfactory as the antioxidant, although other known antioxidants or polymerization inhibitors may be employed in lieu thereof if desired. Amounts of hydroquinone from about 0.005 to about 10 per cent, preferably from about 0.02 to about 5 per cent by weight of the alpha,beta-unsaturated aldehyde are generally satisfactory.

The process of the invention desirably is executed under substantially anhydrous conditions; that is, in the absence of any added quantity of water. The presence of substantial quantities of water may tend to reduce the amount of beta-acyloxy aldehyde formed; however, the small amounts of water that may be present in the commercial, substantially anhydrous grades of the reactants generally do not impair the effectiveness of the process and precautions to effect the removal of such small amounts of water are in general unnecessary.

According to one embodiment of the invention, the desired reaction may be effected by mixing the selected carboxylic acid with the alpha,beta-unsaturated aldehyde reactant, the carboxylic acid desirably being present in amounts not less than about stoichiometrically equivalent to the alpha,beta-unsaturated aldehyde, and preferably in molar excess; such as from about 1.5 moles to about 10 moles, preferably from about 2 to about 6 mols per mole of the alpha,beta-unsaturated aldehyde, and heating the resulting mixture to the reaction temperature under a pressure sufficient to maintain the liquid state. If the reactants are poorly miscible with each other, a minor amount of a mutual inert organic solvent may be added to the mixture, sufficient to form a solution of the reactants. If, as in a preferred embodiment of the invention, mutually soluble, normally-liquid reactants are employed, the presence of a solvent may be excluded. The polymerization inhibitor or antioxidant, if one is to be employed, may be added separately, or it may be added in the form of a solution or dispersion in one of the reactants, e. g., the alpha,beta-unsaturated aldehyde. The desired reaction occurs upon heating the mixture at a suitable elevated temperature. The optimum temperature to be employed depends in part upon the specific reactants employed and in part upon the other conditions employed in the execution of the process. Temperatures of from about 50° C. to about 250° C. may be employed. In the case of the alpha-methylene aldehydes temperatures of from about 50° C. to about 160° C. are particularly suitable because of the tendency of these particularly reactive aldehydes to polymerize at higher temperatures, and a preferred range is from about 60° C. to about 140° C. The process is executed with the reaction mixture in liquid state. The process may be conducted as in a closed autoclave under the autogenous pressure of the reaction mixture at the reaction temperature. Elevated pressures, sufficient to maintain the liquid state, may be applied to the reaction mixture, for example by means of an inert gas, such as nitrogen, methane, carbon dioxide, etc., under pressure. At the conclusion of the heating step of the process, which generally will be after a reaction time of from about 2 to about 12 hours, the reaction mixture may be subjected to a suitable separation treatment to recover the beta-acyloxy aldehyde produced by the process and, if desired, to reclaim any excess or unreacted reactants as for reutilization in the process.

According to a specific embodiment of the invention, lower saturated aliphatic carboxylic acids such as acetic acid and its lower homologs and analogs are reacted with lower 2-alkenals, such as acrolein, to provide valuable saturated beta-acyloxy aliphatic aldehydes. For example, from about 3 to about 6 molar equivalents of glacial acetic acid may be mixed with about 1 molar equivalent of acrolein, and the mixture heated in a closed reaction vessel to a temperature between about 100° C. and about 125° C. for from about 4 to about 8 hours. The reaction mixture then may be fractionally distilled, whereby the beta-acyloxy aldehyde, wherein the acyloxy residue is the acyloxy residue of the carboxylic acid reactant, may be recovered in high yields, generally above about 60% based on the lower 2-alkenal consumed and in good conversions based on the amount of the lower 2-alkenal applied.

It has been discovered that even formic acid may be reacted according to the process with alpha,beta-unsaturated aldehydes of the herein-defined class. The addition of the formic acid to the alpha,beta-unsaturated aldehyde may be accomplished by heating a liquid mixture of substantially anhydrous formic acid and the alpha,beta-unsaturated, preferably in the presence of a polymerization inhibitor and, if desired, an inert solvent, at reaction temperatures of from about 50° C. up to about 150° C. Substantially higher temperatures are less desirable when formic acid is employed, because of the possibility of excessive decomposition of the formic acid at the more elevated temperatures. The desired reaction is favored by the presence of an excess of the acid, use of from about 3 to about 6 molar equivalents of formic acid per molar equivalent of the alpha,beta-unsaturated aldehyde being advantageous.

The process of the present invention may be executed either in a batchwise manner, intermittently, or continuously. The pressure may be either at, above, or below the atmospheric pressure provided it is at least equal to the vapor pressure of the reaction mixture at the temperature employed. In batchwise operations the reaction mixture may be heated under applied pressure or under the autogenous pressure in a closed autoclave which may be provided with means of known type for agitation of the contents, for measurement and control of the temperature, etc. In the event the process is to be executed in a continuous manner, streams of the respective reactants may be proportioned together and the mixture passed into and through a suitable reaction zone, as a reaction vessel or reaction tube maintained at a suitable temperature and pressure, at a rate of flow which provides the required time for reaction. The desired product may be recovered from the reaction mixture according to any suitable method. When the reaction product is volatile, fractional distillation provides a generally suitable method of recovery. Other methods which may be employed include crystallization of the product from the reaction mixture or from crude solution in an organic solvent, extraction with inert solvents, sublimation, precipitation or other treatment with selective solvents, and precipitation of unstable complexes of the beta-acyloxy aldehyde, e. g., bisulfite addition products, from solutions of the crude products. In some cases, as when the desired product is to be employed in the preparation of derived products, the recovery treatment may be modified or eliminated entirely.

The process of the invention may be employed to prepare numerous carboxylic acid esters of beta-oxy aldehydes. Included among such esters are the formic acid esters of beta-oxy aldehydes. By reacting according to the process of the invention formic acid with alpha,beta-olefinic aldehydes there may be prepared the formic acid esters of beta-oxy alpha,beta-saturated aldehydes. Of particular interest, as for use as versatile chemical intermediates, are the 3-formoxy alkanals in which the carbon atom in position No. 2 is a secondary carbon atom. The following are indicative of the many carboxylic acid esters of beta-oxy aldehydes whose preparation by the herein disclosed process is within the broad aspects of the invention: formic esters, such as beta-formoxypropionaldehyde from formic acid and acrolein, beta-phenyl-beta-formoxypropionaldehyde from formic acid and cinnamaldehyde, beta-methyl-beta-formoxybutyraldehyde from formic acid and beta-methylcrotonaldehyde, beta-cyclohexyl-beta-formoxypropionaldehyde from formic acid and beta-cyclohexylacrolein, gamma-tolyl-beta-formoxybutyraldehyde from formic acid and gamma-tolylcrotonaldehyde, alpha-methyl-beta-formoxypropionaldehyde from formic acid and methacrolein, beta-formoxybutyraldehyde from formic acid and crotonaldehyde, beta-ethyl-beta-formoxybutyraldehyde from formic acid and beta-ethylcrotonaldehyde, beta,beta-diethyl-beta-formoxypropionaldehyde from formic acid and beta,beta-diethylacrolein, beta-isopropyl-beta-formoxypropionaldehyde from formic acid and beta-isopropylacrolein, alpha-phenyl-beta-formoxypropionaldehyde from formic acid and alpha-phenylacrolein, and homologous and analogous beta-formoxy aldehydes; esters of other aliphatic carboxylic acid with beta-oxy aldehydes, such as beta-acetoxypropionaldehyde from acetic acid and acrolein, beta-acetoxybutyraldehyde from acetic acid and crotonaldehyde, beta-valeroxypropionaldehyde from valeric acid and acrolein, beta-stearyloxypropionaldehyde from stearic acid and acrolein, the beta-methoxypropionic acid ester of beta-hydroxypropionaldehyde from beta-methoxypropionic acid and acrolein, the palmitic acid ester of beta-hydroxyvaleraldehyde from palmitic acid and beta-ethylacrolein, beta-lauroxyvaleraldehyde from lauric acid and beta-ethylacrolein, alpha-methyl-beta-caproxyvaleraldehyde from caproic acid and alpha-methyl-beta-ethylacrolein, and homologs and analogs thereof; esters of aromatic carboxylic acids with beta-oxy aldehydes such as beta-phenoxyacetoxypropionaldehyde from phenoxyacetic acid and acrolein, beta-benzoxypropionaldehyde from benzoic acid and acrolein, beta-cinnamoxybutyraldehyde from cinnamic acid and crotonaldehyde, beta-(p-methoxybenzoxy)-alpha-phenylpropionaldehyde from anisic acid and alpha-phenylacrolein, beta-(2,4-dichlorobenzoxy)propionaldehyde from 2,4-dichlorobenzoic acid and acrolein, beta-(o-acetoxybenzoxy)propionaldehyde from o-acetoxybenzoic acid and acrolein and homologs and analogs thereof; and esters of cycloaliphatic carboxylic acids with beta-hydroxy aldehydes, such as the cyclohexanecarboxylic acid ester of beta-hydroxypropionaldehyde from cyclohexanecarboxylic acid and acrolein, the cyclopentanecarboxylic acid ester of beta-hydroxybutyraldehyde from cyclopentanecarboxylic acid and crotonaldehyde, the cyclohexaneacetic acid ester of beta-hydroxyvaleraldehyde from cyclohexaneacetic acid and beta-ethylacrolein, the cyclopentanetridecanoic acid ester of beta-hydroxypropionaldehyde from cyclopentanetridecanoic acid and acrolein, and their homologs and analogs.

The compounds which may be produced by the process of the invention are useful in various arts. They are valuable chemical intermediates. For example, they may be converted by reduction to the corresponding monoesters of 1,3-glycols. The 1,3-glycol monoesters are useful as special solvents, as plasticizers, as softening agents, for example, for leather goods, and in certain cases they are potentially valuable as humectants. The carboxylic acid esters of beta-oxy aldehydes obtainable according to the process of the invention may be polymerized and in their polymeric form they may be employed as useful resins which range in character from soft liquids to hard solids. The products of the present process also are useful for the preparation of resinous products as by condensation with aminoplasts, such as urea, melamine, thiourea, and substituted ureas, substituted thioureas, and triazines isomeric to or homologous to melamine, including substituted melamines. Useful resinous products may also be prepared by condensation of the products produced by the present process with phenols, such as phenol or cresol.

Further possible applications for the carboxylic acid esters of beta-oxy aldehydes produced by the present process are as agents for treating proteinaceous substances such as leather, or hides to be used in the preparation of leather, wool, etc. Many of the carboxylic acid esters of beta-oxy aldehydes obtainable by the present process are of potential interest, for example in the form of suitable derivatives thereof, such as their dinitrophenylhydrozones or their oximes, as biologically active materials, or as intermediates for the preparation of biologically active materials.

The following examples will serve to illustrate the process of the invention. The examples are intended to be demonstrative of the invention and not limitations thereon as it is defined in the hereto appended claims.

Example I

Glacial acetic acid, and acrolein containing 1 per cent of hydroquinone were mixed in a mole ratio of 4.5:1, respectively. The mixture was placed in a glass-lined reaction vessel and heated under autogenous pressure for four hours at 120° C. At the end of this time, the mixture was subjected to fractional distillation. Unreacted acrolein and acetic acid first were rapidly distilled off under reduced pressure. Upon continued distillation, under a pressure of 8 millimeters of mercury, beta-acetoxypropionaldehyde was distilled from the remaining portion of the mixture at a temperature of 61° C. The yield of beta-acetoxypropionaldehyde was in excess of 80% based on the acrolein consumed. The conversion of acrolein to beta-acetoxypropionaldehyde was about 29%.

Example II

Two hundred seventy-four parts by weight of acrolein containing 1 per cent of hydroquinone, were mixed with one thousand parts of freshly distilled, anhydrous formic acid and the mixture was heated for four hours at 75° C. in a sealed glass-lined reaction vessel. The resultant mixture was fractionally distilled under reduced pressure. Beta-formoxypropionaldehyde was separated as a colorless liquid distilling at 51° C. to 53° C. under 6.5 millimeters of mercury pressure. Its refractive index ($n$ 20/D) was found to be 1.424(4) and its density ($d$ 20/4) to be 1.552. The molecular refraction ($m$ 20/D) was found to be 22.8 compared to a calculated value of 22.4.

Example III

A mixture of 76 parts by weight of crotonic acid and 56 parts by weight of acrolein containing about 1% by weight of hydroquinone based upon the acrolein was heated in a sealed glass vessel at 120° C. for 4 hours. The resulting mixture was withdrawn from the vessel and diluted with about 250 parts by weight of benzene. The diluted mixture was washed with an aqueous solution of sodium bicarbonate until no more carbon dioxide was evolved. The washed mixture, substantially free of unreacted crotonic acid was dried over anhydrous magnesium sulfate and the benzene was removed from the dried solution by distillation under reduced pressure. The clear, light-yellow, liquid residue was distilled from a Claisen flask under a pressure of one millimeter of mercury. The crotonic acid ester of beta-hydroxypropionaldehyde was recovered as the fraction distilling at 61° C. to 63° C., refractive index of the collected fraction ($n$ 20/D) 1.458. The 2,4-dinitrophenyl hydrazone of the crotonic acid ester of beta-hydroxyacrolein was prepared and recrystallized from solution in ethanol. The 2,4-dinitrophenylhydrazone was found to melt at 86° C. to 88° C. and to have a nitrogen content which confirmed the formula $C_{13}H_{14}N_4O_6$.

Example IV

A mixture of 74 parts by weight of cinnamic acid and 28 parts by weight of acrolein containing about 1% by weight of hydroquinone based upon the weight of the acrolein was heated in a glass tube at 120° C. for 4 hours. After standing at room temperature over night, the resulting semi-crystalline mixture was diluted with benzene and the crystals of cinnamic acid were removed by filtration. The filtrate was washed with aqueous sodium bicarbonate solution until evolution of carbon dioxide ceased. The organic layer was dried over anhydrous magnesium sulfate and the benzene and unreacted acrolein were removed by distillation under reduced pressure. The semi-crystalline residue of beta-cinnamoxypropionaldehyde was found to have an infra-red absorption spectrum in conformity with the expected spectrum of beta-cinnamoxypropionaldehyde. The 2,4-dinitrophenylhydrazone of the beta-cinnamoxypropionaldehyde was prepared and recrystallized from alcohol. The yellow-orange derivative melted at 118° C. to 120° C. and was found to contain 14.7% nitrogen compared to the calculated value of 14.6% nitrogen for the formula $C_{18}H_{16}N_4O_6$.

Example V

A mixture of 28 parts by weight of acrolein containing about 1% of hydroquinone, and 183 parts by weight of benzoic acid was made up and heated in a sealed glass vessel at 120° C. to 125° C. for 4 hours. Unreacted acrolein then was removed from the mixture by distillation under reduced pressure. The residue was dissolved in diethyl ether and the solution extracted with an aqueous solution of sodium bicarbonate to remove any benzoic acid present. The remainder of the organic layer was dried over anhydrous magnesium sulfate and the ether was distilled off under reduced pressure. The residue, crude beta-benzoxypropionaldehyde, was reacted without further purification with 2,4-dinitrophenylhydrazine to form the yellow 2,4-dinitrophenylhydrazone of beta-benzoxypropionaldehyde melting at 146.5° C. to 148° C. after recrystallization from ethanol. The analysis of the derivative was in agreement with the calculated analysis for the 2,4-dinitrophenylhydrazone of beta-benzoxypropionaldehyde. Found, 53.7% carbon and 5.1% nitrogen. Calculated for $C_{16}H_{14}O_6N_4$, 53.6% carbon and 15.6% nitrogen.

Example VI

A mixture of 192 parts by weight of cyclohexanecarboxylic acid and 56 parts by weight of acrolein, containing about 1% by weight of hydroquinone based upon the acrolein was heated in a closed stainless steel vessel at 120° C. for 4 hours. Unreacted acrolein was removed from the resulting mixture by distillation under the reduced pressure. The remaining portion of the mixture was diluted with benzene and the solution extracted by treatment with an aqueous solution of sodium bicarbonate to remove unreacted cyclohexanecarboxylic acid. The benzene was removed from the dried organic layer by distillation under reduced pressure. The residue, a light yellow oil, amounted to 67 parts by weight and contained an amount of cyclohexanecarboxylic acid since the extraction had not completely removed unreacted acid. Titration of the residue with a standardized solution of a base indicated the residue to contain 24 parts by weight of the cyclohexanecarboxylic acid of beta-hydroxypropionaldehyde. The 2,4-dinitrophenylhydrazone derivative of the cyclohexanecarboxylic acid ester of beta-hydroxypropionaldehyde, when prepared and recrystallized from alcohol, was found to melt at 97° C. to 98° C. and to contain carbon and nitrogen in amounts in agreement with the calculated formula. Found, 52.5% carbon and 15.0% nitrogen. Calculated for $C_{16}H_{20}O_6N_4$, 52.7% carbon and 15.4% nitrogen.

This application is a continuation-in-part of copending application Serial 728,962, filed February 15, 1947, now abandoned.

We claim as our invention:

1. Process for the production of an ester of an oxyaldehyde, which process comprises heating in liquid state in a confined reaction zone a mixture comprising as the only reactants an unsaturated aldehyde of the formula

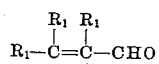

in which each $R_1$ represents one of the class consisting of hydrogen, lower saturated hydrocarbon and monocyclic aromatic hydrocarbon and from about the stoichiometric equivalent of said unsaturated aldehyde to about 10 moles per mole of said unsaturated aldehyde of a carboxylic acid of the formula R—COOH in which R represents a member of the class consisting of hydrogen, aliphatic hydrocarbon, cycloaliphatic hydrocarbon, and aromatic hydrocarbon, in the presence of a phenolic polymerization inhibitor at a temperature of from about 50° C. to about 250° C. for a time up to about 12 hours to produce ester of said carboxylic acid with the beta-hydroxy alpha,beta-saturated aldehyde having the same number and arrangement of carbon atoms as said unsaturated aldehyde.

2. Process for the production of an ester of an oxyaldehyde, which process comprises heating in liquid state in a confined reaction zone a mixture comprising as the only reactants acrolein and from about the stoichiometric equivalent of the acrolein to about 10 moles per mole of acrolein of a carboxylic acid of the formula R—COOH in which R represents a member of the class consisting of hydrogen, aliphatic hydrocarbon, cycloaliphatic hydrocarbon, and aromatic hydrocarbon in the presence of a polymerization inhibitor at a temperature of from about 50° C. to about 250° C. for a time up to about 12 hours to produce the ester of said carboxylic acid and beta-hydroxypropionaldehyde.

3. Process for the production of an ester of an oxyaldehyde, which process comprises heating in liquid state in a confined reaction zone a mixture comprising as the only reactants an unsubstituted 2-alkenal and from about the stoichiometric equivalent of the unsubstituted 2-alkenal to about 10 mols per mole of the unsubstituted 2-alkenal of an aromatic monocarboxylic acid in the presence of a polymerization inhibitor at a temperature of from about 50° C. to about 250° C. for from about 2 hours to about 12 hours to produce the ester of said aromatic monocarboxylic acid with the beta-hydroxy saturated aldehyde having the same number and arrangement of carbon atoms as said unsubstituted 2-alkenal.

4. Process for the production of a saturated aliphatic monocarboxylic ester of a beta-hydroxy aldehyde, which process comprises heating under its autogenous pressure in a confined reaction zone a mixture comprising as the only reactive materials an unsubstituted 2-alkenal, from about 2 to about 6 mols per mole of the unsubstituted 2-alkenal of a saturated aliphatic monocarboxylic acid, and a phenolic polymerization inhibitor at a temperature of from about 60° C. to about 140° C. for from about 2 to about 12 hours.

5. The process for the preparation of the crotonic acid ester of beta-hydroxypropionaldehyde which comprises heating under its autogenous pressure in a confined reaction zone a mixture comprising as its only reactive components acrolein, from about 2 to about 6 moles of crotonic acid per mole of acrolein, and hydroquinone at a temperature of from about 60° C. to about 140° C. for from about 2 to about 12 hours to produce said crotonic acid ester of beta-hydroxypropionaldehyde.

6. The process for the preparation of beta-cinnamoxypropionaldehyde which comprises heating under its autogenous pressure in a confined reaction zone a mixture comprising as its only reactive components acrolein, from about 2 to about 6 moles of cinnamic acid per mole of acrolein, and hydroquinone at a temperature of from about 50° C. to about 160° C. for from about 2 to about 12 hours to produce said beta-cinnamoxypropionaldehyde.

7. The process for the preparation of beta-benzoxypropionaldehyde which comprises heating under its autogenous pressure in a confined reaction zone a mixture comprising as its only reactive components acrolein, from about 2 to about 6 moles of benzoic acid per mole of acrolein, and hydroquinone, at a temperature of from about 50° C. to about 160° C. for from about 2 to about 12 hours to produce said beta-benzoxypropionaldehyde.

8. The process for the preparation of the cyclohexanecarboxylic acid ester of beta-hydroxypropionaldehyde which comprises heating under its autogenous pressure in a confined reaction zone a mixture comprising as its only reactive components acrolein, from about 2 to about 6 moles of cyclohexanecarboxylic acid per mole of acrolein, and hydroquinone at a temperature of from about 50° C. to about 160° C. for from about 2 to about 12 hours to produce said cyclohexanecarboxylic acid ester of beta-hydroxypropionaldehyde.

9. The method of preparing beta-acetoxypropionaldehyde which comprises heating under its autogenous pressure and in the presence of hydroquinone a mixture of about one molar equivalent of acrolein with from about 3 to about 6 molar equivalents of acetic acid at a temperature from about 100° C. to about 125° C. for from about 4 to about 8 hours, and fractionally distilling the resulting mixture to recover beta-acetoxypropionaldehyde.

SEAVER A. BALLARD.
BRADFORD P. GEYER.

References Cited in the file of this patent

UNITED STATES PATENTS

| Number | Name | Date |
|---|---|---|
| 2,093,519 | Hamann | Sept. 21, 1937 |
| 2,416,536 | Neher | Feb. 25, 1947 |

OTHER REFERENCES

Riedel, Annalen, vol. 361, pp. 89–95 (1908).
Shoruigin, Chem. Abstracts, vol. 29, pp. 7941–7942 (1935).